(12) United States Patent
van Blokland

(10) Patent No.: US 9,179,683 B2
(45) Date of Patent: Nov. 10, 2015

(54) DEVICE FOR PROVIDING DOUGH PRODUCTS WITH A TOPPING MATERIAL

(71) Applicant: Radie B.V., Culemborg (NL)

(72) Inventor: Johannes Josephus Antonius van Blokland, Beusichem (NL)

(73) Assignee: Radie B.V., Culemborg (NL)

( * ) Notice: Subject to any disclaimer, the term of this patent is extended or adjusted under 35 U.S.C. 154(b) by 30 days.

(21) Appl. No.: 13/967,858

(22) Filed: Aug. 15, 2013

(65) Prior Publication Data

US 2014/0050825 A1 Feb. 20, 2014

(30) Foreign Application Priority Data

Aug. 17, 2012 (EP) .................................... 12180886

(51) Int. Cl.
*A21C 9/08* (2006.01)
*A21C 9/04* (2006.01)

(52) U.S. Cl.
CPC .... *A21C 9/08* (2013.01); *A21C 9/04* (2013.01)

(58) Field of Classification Search
USPC .............. 99/494, 450.1, 450.7; 425/147, 202, 425/217, 449; 426/289, 296, 94; 118/31, 118/13, 24, 312; 141/134
See application file for complete search history.

(56) References Cited

U.S. PATENT DOCUMENTS

| 3,648,596 | A | 3/1972 | Zito |
| 4,197,794 | A | 4/1980 | Raque et al. |
| 6,588,363 | B1 * | 7/2003 | Burke et al. ................... 118/13 |
| 2008/0187637 | A1 | 8/2008 | Spiegel |

FOREIGN PATENT DOCUMENTS

| AU | 2005234730 A1 | 12/2005 |
| EP | 0397267 A2 | 11/1990 |
| EP | 1188379 A1 | 3/2002 |
| EP | 1388286 A1 | 2/2004 |

* cited by examiner

*Primary Examiner* — Jianying Atkisson
(74) *Attorney, Agent, or Firm* — The Webb Law Firm

(57) ABSTRACT

Method and device for providing dough products with a topping material, comprising a dough product conveyor, for transporting the dough products, a topping dispenser for dispensing topping material onto the dough product conveyor, comprising a topping conveyor, for conveying the topping towards a dispensing location above the dough product conveyor, a collector for superfluous topping material from the dough product conveyor, a supply system, for supplying the topping conveyor with topping material from the collector or from a reservoir with fresh topping material, characterized by a topping material sensor for measuring the amount of topping material on the topping conveyor, a controller, for controlling the amount of topping material to be dispensed by adjusting the speed of the topping conveyor; and the ratio of topping material from the reservoir and the collected superfluous topping material.

6 Claims, 2 Drawing Sheets

DEVICE FOR PROVIDING DOUGH PRODUCTS WITH A TOPPING MATERIAL

CROSS-REFERENCE TO RELATED APPLICATIONS

This application claims priority to European Application No. 12180886.9 filed on Aug. 17, 2012, the disclosure of which is hereby incorporated in its entirety by reference.

BACKGROUND OF THE INVENTION

1. Field of the Invention

The present invention relates to a device for providing dough products with a topping material.

2. Description of Related Art

Devices for arranging toppings on a dough product are known. U.S. Pat. No. 4,197,794 discloses a pizza topping device to apply ingredients to a pastry shell. Pastry shells are covered with a sauce and toppings are applied to the sauced pastry shell from above. The pizza toppings are mixed and arranged to be applied in a layer with a pre-selected depth.

In general, these systems run continuously, even when there is no pastry shell to be covered with toppings and sprinkled toppings on an empty factory line are lost. When excess toppings are fed back to the system they tend to clog up the supply of toppings, resulting in dense balls of toppings that cannot be spread evenly over the dough products. All in all the fresh toppings are not applied effectively and evenly to the dough product which results in unnecessary deterioration of these products.

It is therefore a goal of the present invention to provide a device for providing dough products with a topping material, that takes away the above disadvantages, and/or to provide a useful alternative to the state of the art.

SUMMARY OF THE INVENTION

The invention thereto proposes a device for providing dough products with a topping material, comprising a dough product conveyor, for transporting the dough products, a topping dispenser for dispensing topping material onto the dough product conveyor, comprising a topping conveyor, for conveying the topping towards a dispensing location above the dough product conveyor, comprising a first topping conveyor stage, comprising a first rotatable rake for raking the topping material, a second topping conveyor stage, arranged under the supply system and above the first conveyor stage, and comprising a second rotatable rake for raking the topping material, with at least one first topping material sensor for measuring the amount of topping material on the first topping conveyor stage and at least one second topping material sensor for measuring the amount of topping material on the second topping conveyor stage, and a controller, for controlling, based at least on signals from the first and second topping material sensors, the amount of topping material dispensed from the first topping conveyor stage to the dough product conveyor; and the amount of topping material dispensed from the second topping conveyor stage to the first conveyor stage.

The device according to the present invention had the advantage that a more accurate control of the height of the stack of topping material is applied. As a result, the topping material, is not compressed by its own weight, and a more even distribution and density is obtained, which leads to better reproducible topped dough products. Topping material may include cheese, vegetables, dairy products, herbs, spices, meat products, (dried) fruit and nuts.

For obtaining an even distribution of topping material on the topping conveyor, the topping conveyor comprises multiple topping conveyor stages. Each conveyor stage is equipped with a rake for raking the topping material and to spread the topping material evenly over the topping conveyor wherein dense clogs of topping material are separated.

The controller may further be configured for controlling the relative speed of the dough product conveyor and the first and/or second topping conveyor stage for determining the amount of topping material to be dispensed on the of dough products.

In a preferred embodiment, the device comprises a collector for superfluous topping material from the dough product conveyor; and a supply system, for supplying the topping conveyor with topping material from the collector or from a reservoir with fresh topping material wherein the controller is further configured to control the amount of topping material from the reservoir to be added to the collected superfluous topping material.

In practice, it appears that about one third of the dispensed topping material is returned. These superfluous toppings are collected and returned to the supply system by, for instance, a return conveyor or a bucket system. The controller controls the amount of toppings on the topping conveyor. When the amount of returned collected superfluous toppings is insufficient to top the dough products on the dough product conveyor, the reservoir with fresh toppings can be used, to supply additional fresh toppings to the topping conveyor. When sufficient collected toppings are available, the controller may halt the supply of fresh toppings and only feed collected toppings to the topping conveyor. The speed of the topping conveyor (relative to the speed of the dough piece conveyor) is controlled to determine the amount of topping delivered to the dough pieces.

The controlling of the amount and ratio of the toppings on the topping conveyor ensures that the topping material on the topping conveyor does not stack and the topping material is not compressed. Therefore clots, balls of toppings and lumps of topping material can be avoided, yielding a more even and better reproducible distribution of toppings on the dough products. The dough product may include pizza dough, bread dough, biscuit dough, and other dough suited to be supplied with toppings, and also pizza, bread, biscuits and other baked dough suited to be supplied with toppings.

In an embodiment of the present invention the device is equipped with a sensor for determining the amount of dough products on the dough product conveyor, wherein the controller is configured for controlling the amount of topping material to be dispensed based on the amount of dough products.

The amount of superfluous topping material can be reduced by supplying topping material to the dough product conveyor only when dough products are present. The amount of toppings can also be varied based on the amount of dough products on the dough product conveyor. This way, when no dough products are present, no toppings are supplied, saving the toppings and keeping them fresh, and when the dough product conveyor is full of dough products, plenty of topping materials can be dispersed to ensure that all dough products are supplied with toppings. The device can therefore be configured to provide multiple rows of dough products on the dough piece conveyor with topping material.

Even though clogging of topping material on the topping conveyor is minimized by controlling the amount of toppings on the topping conveyor, the supply system and the toppings on the topping conveyor could contain topping material with uneven densities, such as dense topping balls or topping clots, clogs or lumps. To ensure an equal distribution of toppings from the topping dispenser to the dough piece conveyor the topping dispenser could be equipped with a rotatable rake, for raking the topping material, and a dispersion roller, for equally dividing the topping material over the dough piece conveyor.

The rotatable rake is located over the entire width of the topping conveyor to spread the topping material evenly over the topping conveyor wherein dense clogs of topping material are separated. The evenly distributed topping material is then evenly divided on the dough products by the dispersion roller, which is located after the rake. The speed at which the rake and dispersion roller rotate can be set by the operator, or by a control system.

In another embodiment of the present invention the first conveyor stage and the second conveyor stage respectively comprise a first and a second topping material sensor, and the controller is configured for controlling the amount of topping material on the first and the second conveyor stage, based on the signal of the first and a second topping material sensors.

Similar to the function of the embodiment with a single conveyor stage, clotting and condensing of topping material on the conveyors is prevented. The conveyor stages are equipped with topping material sensors, to measure the amount of toppings on the topping conveyors on the different conveyor stages. When the amount of toppings on a topping conveyor exceeds a certain value, the toppings are condensed by the shear weight of the toppings, which should be avoided. Therefore the control system controls, based on the measurements of the topping material sensors, the speed of the different conveyors and supply systems. In this fashion the amount of toppings on the different conveyor stages can be monitored and regulated.

In an embodiment of the present invention the collector comprises a dough product conveyor comprising a first and a second conveyor part, wherein the first and second conveyor part extend in the same direction but with a small slit in between them for enabling topping material to fall through, and a conveyor or bucket system for catching the topping material and transferring it to the topping conveyor.

The small slit between the two different conveyor parts ensures that dough products on the conveyor parts are transferred from the first conveyor part to the second conveyor part without a hitch, whereas small topping material is not transferred and falls though. The superfluous topping material is collected under the slit, where a conveyor or bucket system is present to return the collected topping material to the supply system. The superfluous toppings can be returned to a separated container in the supply system, where the controller controls the dispersion of fresh and collected topping material.

In another embodiment of the present invention the supply system is configured for spreading the topping equally over the width of the topping conveyor.

A further contribution to an equal and reproducible distribution of the topping material to the dough products may be obtained by arranging the topping material evenly over the width of the topping conveyor(s). Thereto, the supply system may comprise a conveyor with a movable end position, which is controlled such to provide a constant density of topping material over the conveyor. In case a return system with separate trais, boxes or containers is used, their depositing positions over the width of the topping material conveyor may be controlled.

BRIEF DESCRIPTION OF THE DRAWINGS

The invention will now be elucidated into more detail, with reference to the following non-limitative figures. Herein.

DESCRIPTION OF THE INVENTION

Figure 1:
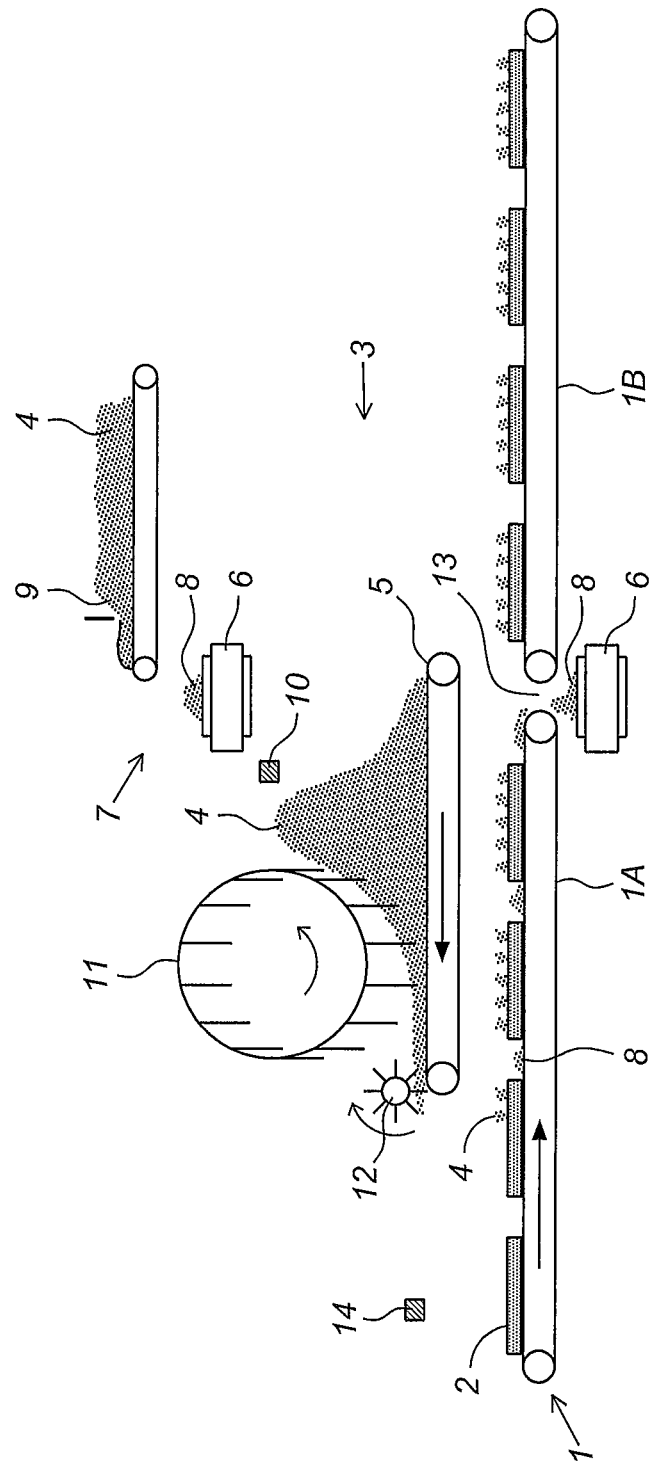
FIG. 1 shows a schematic view of the invention with one conveyor stage.

FIG. 1 shows a dough product conveyor 1, for transporting dough products 2, a topping dispenser 3 for dispensing topping material 4 onto the dough product conveyor 1, comprising a topping conveyor 5, for conveying the toppings 4 towards a dispensing location above the dough product conveyor 1, a collector 6 for superfluous topping material 8 from the dough product conveyor 1, a supply system 7, for supplying the topping conveyor 5 with topping material 8 from the collector or from a reservoir with fresh topping material 9, and a topping material sensor 10 for measuring the amount of topping material 4 on the topping conveyor 5. The toppings 4 on the topping conveyor 5 are raked by rake 11 to dissolve any lumps of topping material and dispensed by dispersion roller 12, for equally dividing the topping material over the dough piece conveyor 1. The dough piece conveyor 1 comprises two parts, a first 1A and a second 1B conveyor part, wherein the first and second conveyor part extend in the same direction but with a small slit 13 in between them for enabling topping material to fall through, and a conveyor or bucket system 6 for catching the topping material and transferring it to the topping conveyor 5. Sensor 14 is shown to determine the amount of dough products 2 on the dough piece conveyor 1.

Figure 2:
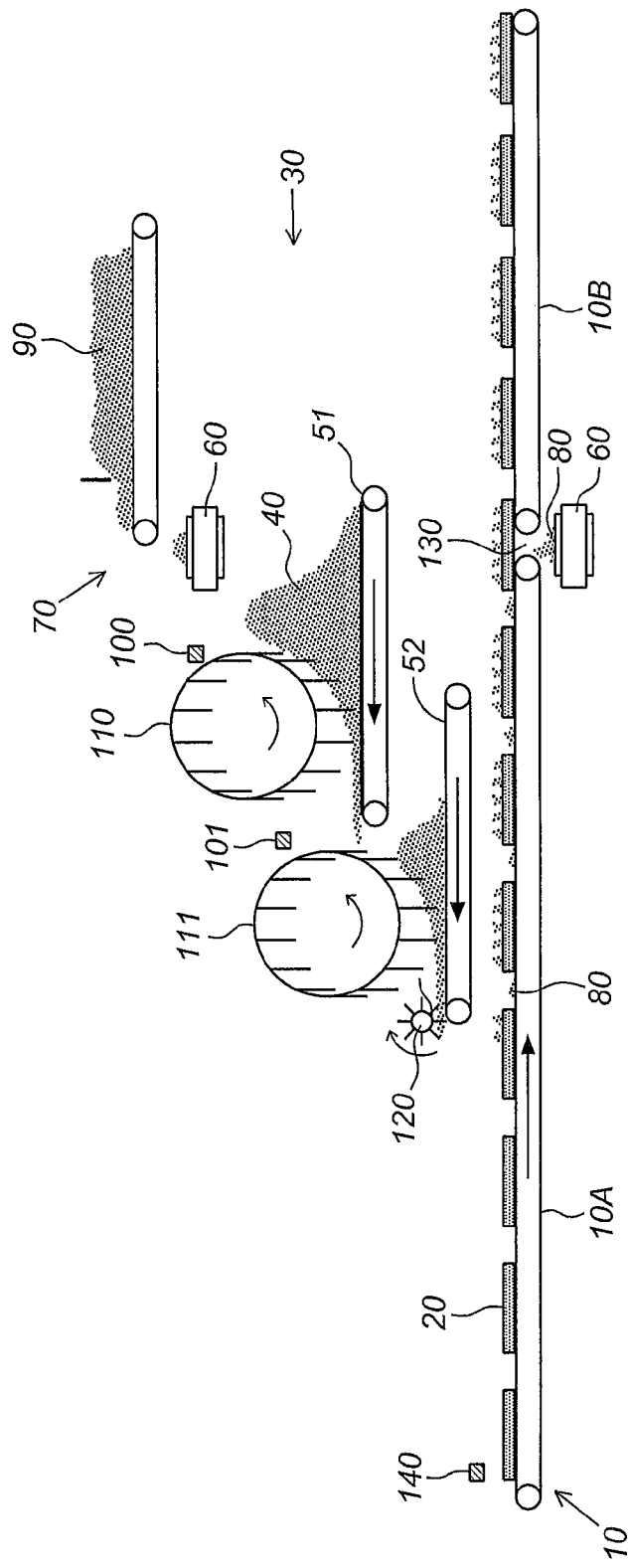
FIG. 2 shows a schematic view of the invention with two conveyor stages.

FIG. 2 shows a dough product conveyor 10, for transporting dough products 20, a topping dispenser 30 for dispensing topping material 40 onto the dough product conveyor 10, comprising a first topping conveyor stage 51, for conveying the toppings 40 towards a second topping conveyor stage 52, for conveying the toppings towards a dispensing location above the dough product conveyor 10, a collector 60 for superfluous topping material 80 from the dough product conveyor 10, a supply system 70, for supplying the first topping conveyor stage 51 with topping material 80 from the collector or from a reservoir with fresh topping material 90, a first topping material sensor 100 for measuring the amount of topping material 40 on the first topping conveyor stage 51 and a second topping material sensor 101 for measuring the amount of topping material 40 on the second topping conveyor stage 52. The toppings 40 on the first topping conveyor stage 51 are raked by rake 110 to dissolve any lumps of topping material. The toppings 40 on the second topping conveyor stage 52 are raked by rake 111 to dissolve any lumps of topping material and dispensed by dispersion roller 120, for equally dividing the topping material over the dough piece conveyor 10. The dough piece conveyor 10 comprises two parts, a first 10A and a second 10B conveyor part, wherein the first and second conveyor part extend in the same direction but with a small slit 130 in between them for enabling topping material to fall through, and a conveyor or bucket system 60 for catching the topping material and transferring it to the first topping conveyor stage 51. Sensor 140 is shown to determine the amount of dough products 20 on the dough piece conveyor 10.

In an embodiment, the device shown in FIG. 2 is controlled as follows. The dough product conveyor 10a is run at a constant speed and transports products to be strewn with speed V_Belt_A m/min. The amount of products to be strewn is detected by sensor 140, which may be a photocell or a camera. The first topping material conveyor 52 of rake 111 determines the amount of strew material to be strewn on the products. A desired speed relative to the speed of the dough product conveyor 10a is set by an operator. The rake 111 makes sure that an even amount of strew material is applied to the product, and also makes sure that the strew material keeps uncondensed. The speed is preferably fixed and set by the operator. A dispersion roller 120 helps in evenly dividing the strew material on the products. The speed of this roller 120 may also be set by the operator, and may be chosen in dependence of the type of topping material that is applied. Ultrasonic or photoeye sensor 101 measures the height of the strew material in front of the rake 101, and conveyor 51 of rake 110 determines the amount of material to be fed onto conveyor 52. Rake 110 makes sure that an even amount of strew material is applied to the hopper of belt 52, making sure that the strew material keeps uncondensed. The speed is fixed and set by the operator.

Ultrasonic or photoeye sensor(s) 100 measure the height in front of rake 110. Measurements may take place at several points over the width of the conveyor to make sure that the level in front of rake 110 is also evenly spread. For instance, four sensors may be applied when four lanes of products will be strewn.

A collector for superfluous topping material 60 transports the rest material to conveyor 51. Also fresh strew material is applied when controller determines so based on the sensor signals. The collector for superfluous topping material 60 may be a belt system as well as a bucket transport system. The control of this system makes sure that the level in front of rake 110 is evenly filled. When the level on four positions is measured, the collector for superfluous topping material 60 can supply the topping material on 4 positions of conveyor 101. The fresh material supply conveyor 90 (which may be a belt or an auger) is controlled by the control system using the information from the sensors.

An operator may enter one or more of the following parameters in an operator panel:
the surface of the product (mm2)
the desired strew weight (gram)
the speed of conveyor 10A (m/min)
the height of rake 111 (mm)
the speed of rake 111 (revolutions/min)
the desired level in front of rake 111 (mm)
the ratio between speed belt 52 relative to the speed of belt 111
the height of rake 110 (mm)
the speed of rake 110 (revolutions/min)
the desired level in front of rake 110 (mm)
the speed of the dispersion roller 120 (revolutions/min)
the desired level in front of rake 110
the speed of the collector for superfluous topping material 60

The controller executes the following statements:
Calculate the Conveyor52_speed=Conveyor10A_speed*ratio
Calculate the percentage superflous=100%*(Conveyor10A_speed*Conveyor52]_widthNumber_of_products/min*Surface/product)/(Conveyor10A_speed*Conveyor52]_width)
Calculate the Conveyor51_base_speed=Conveyor52_speed*Rake111_height/Rake110_height
Correct the Conveyor51_speed=Conveyor51_base_speed+PI_output(Desired_level_in_front_of_Rake111−Actual_Level101)
Average the Actual_Level100
Calculate the fresh material supply speed Conveyor90_base_speed=((100−Return_percentage)/100)*Conveyor51_speed*Rake110_height*Conveyor51_width/(Conveyor90_height*Conveyor90_width])
Correct the Conveyor90_speed=Conveyor90_base_speed+PI_output(Desired_level_in_front_of_Rake110−Actual_average_Level100)

When the return system 60 is a belt system the time filling the individual lanes is divided proportionally to the levels measured. The positioning of the upper belt of return system 60 can be determined by servo positioning.

When the collector for superfluous topping material 60 is a bucket system the filling of the individual lanes is established by emptying individual buckets on the desired lane.

When no products are measured for 10 seconds at the sensor 140 the following items will be stopped (with a distance delay calculated from sensor 140 to the position of dispersion_roller 120):
Conveyor52, Rake111, Dispersion_Roller120, Belt51, Rake110, Fresh_topping_supply90.

The collector for superfluous topping material 60 will be stopped with an extra distance delay calculated from distance position dispersion_roller120 to the collector for superfluous topping material 60. This is done to prevent an overfill situation in front of Rake110. When products arrive at the detection point 140 the following items will be restarted again directly:
Conveyor52, Rake111, Dispersion_Roller120, Belt51, Rake110, Fresh_dough_supply90

The collector for superfluous topping material 60 will be restarted delayed with an extra distance delay calculated from distance position dispersion_roller120 to position collector for superfluous topping material 60.

The invention claimed is:
1. A device for providing dough products with a topping material, comprising:
a dough product conveyor, for transporting the dough products;
a topping dispenser for dispensing topping material onto the dough product conveyor, comprising:
a topping conveyor, for conveying the topping towards a dispensing location above the dough product conveyor, comprising
a first topping conveyor stage, comprising a first rotatable rake for raking the topping material;
a second topping conveyor stage, arranged under the supply system and above the first conveyor stage, and comprising a second rotatable rake for raking the topping material;
a first topping material sensor for measuring the amount of topping material on the first topping conveyor stage;
a second topping material sensor for measuring the amount of topping material on the second topping conveyor stage;
a controller, for controlling, based at least on signals from the first and second topping material sensors,
the amount of topping material dispensed from the first topping conveyor stage to the dough product conveyor; and
the amount of topping material dispensed from the second topping conveyor stage to the first conveyor stage, wherein
a collector for superfluous topping material from the dough product conveyor; a supply system, for supplying the topping conveyor with topping material from the collector or from a reservoir with fresh topping material;
wherein:
the controller is further configured to control the amount of topping material from the reservoir to be added to the collected superfluous topping material.

2. The device according to claim 1, further comprising a third sensor for determining the amount of dough products on the dough product conveyor.

3. The device according to claim 1, wherein the controller is configured for controlling the relative speed of the dough product conveyor and the first topping conveyor, the second topping conveyor, or the first topping conveyor and the second topping conveyor for determining the amount of topping material to be dispensed on the dough products.

4. The device according to claim 1, wherein the topping dispenser comprises:
at least one dispensing roller, for equally dispensing the topping material over the dough piece conveyor.

5. The device according to claim 1, wherein the collector comprises a dough product conveyor comprising a first and a second conveyor part, wherein the first and second conveyor part extend in the same direction but with a small slit in between them for enabling topping material to fall through, and a conveyor or bucket system for catching the topping material and transferring it to the supply system.

6. The device according to claim 1, wherein the supply system is configured for spreading the topping equally over the width of the topping conveyor.

* * * * *